US005612429A

United States Patent [19]
Kimpton et al.

[11] Patent Number: 5,612,429
[45] Date of Patent: Mar. 18, 1997

[54] PROCESS FOR THE POLYMERIZATION OF POLYMERS IN NON-AQUEOUS LIQUID MEDIA

[75] Inventors: Paul T. Kimpton, Northants, Great Britain; Mark P. Houghton, Rotterdam; Stephen W. Russell, Maasland, both of Netherlands

[73] Assignee: National Starch and Chemical Investment Holding Corporation, Wilmington, Del.

[21] Appl. No.: 420,391

[22] Filed: Apr. 12, 1995

Related U.S. Application Data

[63] Continuation-in-part of Ser. No. 175,895, Dec. 30, 1993, abandoned, which is a continuation of Ser. No. 871,449, Apr. 21, 1992, abandoned.

[51] Int. Cl.$^6$ .................................. C08F 2/04; C08F 2/32
[52] U.S. Cl. ...................... 526/209; 525/242; 525/299; 526/211; 526/216

[58] Field of Search .................... 526/209, 210, 526/211, 213, 216, 220; 525/242, 299

[56] References Cited

U.S. PATENT DOCUMENTS

| 4,267,103 | 5/1981 | Cohen | 526/209 |
| 4,272,619 | 6/1981 | Balle | 521/169 |
| 4,529,787 | 7/1985 | Schmidt | 526/213 |

OTHER PUBLICATIONS

SchildKnecht, C.E., Polymerization Process, Wiley & Sons 1977, p. 193.
WO89/05826 Jun. 29, 1989.

*Primary Examiner*—Christopher Henderson
*Attorney, Agent, or Firm*—Ellen T. Dec; William K. Wissing

[57] ABSTRACT

Polymers can be prepared by polymerizing appropriate monomers in a substantially non-aqueous liquid medium comprising a detergent and/or an ester of a polyhydic alcohol. The invention also includes novel polymers which can be prepared by this process.

11 Claims, No Drawings

PROCESS FOR THE POLYMERIZATION OF POLYMERS IN NON-AQUEOUS LIQUID MEDIA

This is a continuation-in-part of application Ser. No. 08/175,895 filed Dec. 30, 1993, now abandoned which was a continuation of Ser. No. 07/871,449 filed Apr. 21, 1992, now abandoned.

BACKGROUND OF THE INVENTION

1. Field of the Invention

The present invention relates to a method for preparing polymers as well as to the novel polymers per se. Many of these polymers are especially, although not exclusively, suitable for use in substantially non-aqueous liquid cleaning product compositions.

2. Background of the Invention

It is well known that polymerization in solution can be performed in many different reaction media. It is convenient to regard these media as falling into two categories, namely aqueous and non-aqueous.

When the polymer solution is required in essentially non-aqueous form such as is necessary for preparing non-aqueous liquid cleaning products, then it is very inconvenient to prepare the polymer in an aqueous solvent. Moreover, polymers prepared in aqueous media introduce undesirable amounts of water into the final product. For example, if the polymer is prepared as a 50% aqueous solution, and is to be incorporated as 10% by weight of the final total composition, this would introduce 10% of water into the final product causing rapid degradation of water sensitive components such as bleaches, etc.

It is already known to polymerize monomers in non-aqueous solvents such as lower alcohols, ethers, esters, hydrocarbons, halogenated hydrocarbons, etc. However, these materials are usually toxic, inflammable and have a noxious odor. More importantly, they can have a deleterious effect on non-aqueous liquid cleaning products into which they are incorporated.

It is known that after preparation, polymers can be extracted from either aqueous and non-aqueous solvent media by evaporation, precipitation, spray-drying or like method but this is time-consuming and expensive.

SUMMARY OF THE INVENTION

We have now found that useful polymers may be prepared by a process comprising polymerizing at least one monomer in a substantially non-aqueous liquid medium comprising a detergent and/or an ester of a polyhydric alcohol. In this respect, a substantially non-aqueous liquid medium is defined as one which contains no more than 10% by weight of water, typically less than 5%, preferably less than 3% and most preferably less than 1%.

Using the substantially non-aqueous liquid medium mitigates or overcomes the aforementioned drawbacks. Furthermore, the process of the present invention may provide advantageous properties to the resultant polymers by incorporating some of the detergent or polyhydric alcohol ester into their structure.

The polymers produced by the process of the present invention are those which find application in non-aqueous liquid detergent cleaning product compositions. In the context of such non-aqueous liquid cleaning products, the liquid phase comprises a non-aqueous liquid detergent and/or other non-aqueous solvent. The water content requirement for such products is generally the same as for the non-aqueous liquid detergent of the polymerization medium of the present invention. Typical non-aqueous liquid cleaning products are described in European Patent Specification EP-A-266 199.

DETAILED DESCRIPTION OF THE PREFERRED EMBODIMENT

The polymers produced herein comprise random or block co-polymers having the general formula $$A_n B_m C_p$$

wherein:

A is a monomer or a mixture of monomers comprising a group capable of extending away from the surface of solid particles dispersed in a liquid phase of a non-aqueous liquid cleaning product;

B is a monomer or a mixture of monomers comprising a group capable of association with the solid particles; and C is a monomer or a mixture of monomers capable of reacting with A and B, or is absent.

Preferred examples of copolymers of the above-mentioned general formula are those where: A is selected from polyalkoxy groups, polyalkoxylated fatty alcohol groups, long-chain alkyl groups, polyethylene glycol groups, polyalkoxylated fatty alcohol groups, polyalkoxylated alkyl groups and polyester groups; B is selected from carboxylate groups, sulphonate groups, sulphate groups, either as acids or their corresponding salts or esters, amine groups and silane groups; and C is a group capable of forming a copolymer with A and B; more particularly C is a $C_1$ to $C_6$ mono- or dicarboxylic acid; a $C_1$ to $C_6$ ester of a mono- or dicarboxylic acid or the corresponding hydroxy derivatives thereof or styrene or vinyl acetate. In a particularly preferred embodiment B is a sulphonate group and C is acrylic acid, methyl methacrylate, hyroxypropyl acrylate or butyl acrylate.

As used herein, the term copolymer means a polymer produced from two or more different monomers.

In terms of block arrangements, B—$(A)_n$ and —(—A—B$)_n$ are preferred although A—B and A—B—A are most preferred. B—A—B, (A—B$)_n$ and —(—B—A$)_n$ are less preferred.

It is also preferred that the molar ratio of n:m is from 100:1 to 1:100, more preferably from 50:1 to 1:50, most preferably from 10:1 to 1:10. Either p is 0 or p is >0 and the molar ratio of (n+m):P is preferably from 100:1 to 1:100, more preferably from 50:1 to 1:50, most preferably from 5:1 to 1:30.

Preferably, the weight average molecular weight of the polymer material as determined by aqueous gel permeation chromatograph using polyacrylate standards, is from 500 to 500,000, more preferably from 1,000 to 100,000, most preferably from 3,000 to 25,000. The determination method is based on aqueous phosphate buffer eluant using Toya Soda and Polymer Laboratories aqueous GPC columns with an ultraviolet detector set at 215 nm.

The medium used for the polymerization process of the present invention may comprise one or more surfactants and/or one or more esters of polyhydric alcohols provided that the medium is liquid at the temperature at which the polymerization takes place, for example from 0° to 200° C., preferably from 50° to 120° C. and most preferably from 60° to 90° C.

Suitable detergents may be selected from nonionic, anionic, cationic, zwitterionic and amphoteric surfactants (including soaps), for example any chosen from the classes, sub-classes and specific materials described in "Surface Active Agents" Vol. I, by Schwartz & Perry, Interscience 1949 and "Surface Active Agents" Vol. II by Schwartz, Perry & Berch (Interscience 1958), in the current edition of "McCutcheon's Emulsifiers & Detergents" published by the McCutcheon division of Manufacturing Confectioners Company or in "Tensid-Taschenbuch", H. Stache, 2nd Edn., Carl Hanser Verlag, München & Wien, 1981.

The liquid nonionic surfactants are a preferred class of materials for forming all of the polymerization medium. Nonionic detergent surfactants are well-known in the art. They normally consist of a water-solubilizing polyalkoxylene or a mono- or di-alkanolamide group in chemical combination with an organic hydrophobic group derived, for example, from alkylphenols in which the alkyl group contains from about 6 to about 12 carbon atoms, dialkylphenols in which each alkyl group contains from 6 to 12 carbon atoms, primary, secondary or tertiary aliphatic alcohols (or alkyl-capped derivatives thereof), preferably having from 8 to 20 carbon atoms, monocarboxylic acids having from 10 to about 24 carbon atoms in the alkyl group and polyoxypropylenes.

Also common are fatty acid mono- and di-alkanolamides in which the alkyl group of the fatty acid radical contains from 10 to about 24 atoms and the alkyloyl group having from 1 to 3 carbon atoms. In any of the mono- and di-alkanolamide derivatives, optionally, there may be a polyoxyalkylene moiety joining the latter groups and the hydrophobic part of the molecule.

In all polyalkoxylene containing surfactants, the polyalkoxylene moiety preferably consists of from 2 to 20 groups of ethylene oxide or of ethylene oxide and propylene oxide groups. Among the latter class, particularly preferred for use as all or part of the liquid phase, are those described in European patent specification No. EP-A-225,654.

Also preferred are those ethoxylated nonionics which are the condensation products of fatty alcohols with from 9 to 15 carbon atoms condensed with from 3 to 11 moles of ethylene oxide (EO). Examples of these are the condensation products of $C_{11-13}$ alcohols with about 3 to 7 moles of ethylene oxide. These may be used as the sole nonionic surfactants or in combination with those described in the above-mentioned European Specification, especially as all or part of the liquid phase.

Mixtures of different nonionic detergent surfactants may also be used. This includes the combined use of detergency nonionics with non-detergency nonionics, for example mixtures of alkoxylated fatty alcohols containing 5 to 10 EO groups and alkoxylated alcohols containing 2 to 4 ethylene oxide groups.

A particularly preferred ester of a polyhydric alcohol to be used instead of or in conjunction with the non-aqueous detergent is glycerol triacetate.

The polymerization medium may also comprise any other ingredients in the solid or liquid phase, including such materials which may be commonly used as components of non-aqueous liquid detergent cleaning products (eg., as described in EP-A-266 199), provided that such other ingredients do not completely inhibit the polymerization process.

The polymerization reaction conditions will be any suitable for the particular monomers, liquid detergent medium and any other ingredients, in the particular circumstances. While water must be substantially excluded, within the limits hereinbefore defined, there are some instances wherein the presence of a very small amount of water and/or solvent is advantageous, for example to dissolve certain ingredients necessary to perform the polymerization, or to control the molecular weight of the polymer more accurately.

The process of the present invention is especially suited to, inter alia, the addition free radical polymerization of ethylenically unsaturated compounds using initiators, especially those free radical initiators wholly or partly soluble in the liquid detergent medium. While the temperature used will vary depending on the half life of the initiators, the polymerization temperature will generally range from 30° to 100° C., preferably about 80° C. Although continuous or semi-continuous polymerization procedures may be used, it is preferred to employ a batch or slow addition process wherein the monomer and initiator are added together or concurrently over a period of time, varying from 1 to 10 hours, preferably from 3 to 4 hours.

The present invention will now be described in more detail by the following examples.

EXAMPLE A1

To a round bottomed flask was added 910 g of Dobanol 91-6 (a C9-11 alcohol/6.5 ethylene oxide synthetic alcohol ethoxylate available from Shell UK).

This was heated to 80° C.±2° C. and stirred with a stainless steel paddle stirrer. Over a period of 3 hours was added dropwise with stirring, a mixture consisting of:

|  | Weight (g) |
| --- | --- |
| Acrylic Acid (glacial) | 104 |
| Commercial lauryl methacrylate (methacrylester $C_{13}$ from ROHM GmbH) | 56 |
| 2-acrylamido-2-methyl propane sulphonic acid (100% solid) | 1.6 (1) |
| Deionized water | 5 (1) |
| Isopropanol | 20 (2) |
| Vazo 67 | 1.6 (3) |

(1) dissolved together separately
(2) as chain transfer agent
(3) 2,2'-Azo bis(2-methylbutyronitrile) available from DuPont At the end of the 3 hour reaction period, about 10 g of aqueous isopropanol was removed by azeotropic distillation in a 30 minute period under vacuum at 80° C.

The resulting polymer had a solids content of 15%, weight average molecular weight (determined by aqueous GPC using polyacrylate standards) of 12,000. The water content was calculated as a maximum value of 0.5%. This polymer yielded calculated weight ratios of acrylic acid 64, 2-acrylamido-2-methyl propane sulphonic acid 1, lauryl methacrylate 35.

EXAMPLES A2–A8

The polymers defined in the following table were prepared in an analogous method to that described in Example A1.

| Example Polymer | MW | AA | MMA | AMPS | Extending Group | Extending Group Type |
|---|---|---|---|---|---|---|
| A2 | 12000 | 55 |  | 10 | 35 | Lauryl methacrylate |
| A3 | 12000 |  | 70 | 20 | 10 | Lauryl methacrylate |
| A4 | 12000 |  | 45 | 20 | 35 | Lauryl methacrylate |
| A5 | 12000 | 70 |  | 20 | 10 | Lauryl methacrylate |
| A6 | 12000 | 45 |  | 20 | 35 | Lauryl methacrylate |
| A7 | 12000 | 60 |  | 20 | 20 | Lauryl methacrylate |
| A8 | 12000 | 65 |  | 20 | 15 | Lauryl methacrylate |

AA = acrylic acid = monomer C
MMA = methyl methacrylate = monomer C
AMPS = 2-acylamido-2-methyl propane sulphonic acid = monomer B
Extending Group = As indicated = monomer A By an analogous method, Examples C1 to C9 were prepared omitting the isopropanol ingredient, except for Example C2 where 1.8% by weight isopropanol was used.

| Example Polymer | AA | MMA | HPA | AMPS | Extending Group | Extending Group Type |
|---|---|---|---|---|---|---|
| C1 | 0 | 0 | 80 | 10 | 10 | Lauryl meth-acrylate |
| C2 | 45 | 0 | 0 | 20 | 35 | Lauryl meth-acrylate |
| C3 | 0 | 45 | 0 | 20 | 35 | Lauryl meth-acrylate |
| C4 | 0 | 80 | 0 | 10 | 10 | Lauryl meth-acrylate |
| C5 | 80 | 0 | 0 | 10 | 10 | Lauryl meth-acrylate |
| C6 | 0 | 90 | 0 | 10 | 0 | — |
| C7 | 0 | 80 | 0 | 10 | 10 | Stearyl meth-acrylate |
| C8 | 0 | 80 | 0 | 10 | 10 | PEG 350 MA |
| C9 | 0 | 80 | 0 | 10 | 10 | PEG 2000 MA |

AA Acrylic acid = Monomer C
MMA Methyl methacrylate = Monomer C
HPA Hydroxy propyl acrylate = Monomer C
AMPS 2-acrylamido-2-methyl propane sulphonic acid = Monomer B Extending group=as indicated wherein (Monomer A) PEG refers to average molecular weight of polyethylene glycol. MA refers to methacrylate esters.

EXAMPLE A10

To similar equipment as in Example A1, 872 g of Vista 1012-62 (a narrow cut ethoxylated nonionic surfactant available from Vista Limited) was added. This was heated to 55° C.±2° C. Over a period of ½ hour was added slowly in small aliquots with stirring, 203 g of powered maleic anhydride.

This was kept at 55° C. for a further 6 hours with stirring and formed the maleic half ester of Vista 1012-62.

The residual maleic anhydride content of the liquid at this stage was 1.2%

To larger equipment than in Example A1, i.e., a 10 liter round bottomed flask was added 4908 grams of Vista 1012-62 alcohol ethoxylate. This was heated to 80°±2° C. Over a period of 3 hours was added with stirring, a mixture consisting of:

| | Weight (g) |
|---|---|
| 2-acrylamido-2-methyl propane sulphonic acid 100% | 260 (1) |
| Deionized Water | 260 (1) |
| Acrylic acid | 845 |
| Vista maleate half ester | 195 |
| Vazo 67 | 20 |

(1) dissolved together separately

At the end of the 3 hour period, the liquid was cooled, and gave a polymer solution with 20% solids, weight average molecular weight 9100, and a calculated water content of 4.0% by weight. This gave a polymer of calculated weight ratios of acrylic acid 65, 2-acrylamido-2-methyl propane sulphonic acid 20, Vista 1012-62 maleate half ester 15.

By an analogous method, the polymer of Example A9 was also prepared:

| Example Polymer | MW | AA | AMPS | Extending Group | Extending Group Type |
|---|---|---|---|---|---|
| A9 | 15500 | 65 | 20 | 16 | Dobanol 91-6 maleate half ester |

EXAMPLE A11

To similar equipment as in Example A1 was added 1200 grams of Vista 1012-62. This was heated to 80° C.±2° C. Over a period of 3 hours was added with stirring, a mixture consisting of:

| | Weight (g) |
|---|---|
| 2-acrylamido-2-methyl propane sulphonic acid | 67 (1) |
| Deionized water | 67 (1) |
| Glacial acrylic acid | 200 |
| PEG 350 methacrylate | 33 (2) |
| Vazo 67 | 9 |

(1) dissolved separately
(2) available from BP Chemicals

The resulting polymer has a solids content 20%, weight average molecular weight 9250, residual acrylic acid content 0.04% and viscosity of 8100 cps when measured on a Brookfield RVT viscometer at 25° C., spindle 5, speed 20. The water content was calculated as 4.3%. The polymer yielded a calculated weight ratio of acrylic acid 66.7, 2-acrylamido-2-methyl propane sulphonic acid 22.3, PEG 350 methacrylate 11.

By an analogous method, Examples A12 and A14 were prepared:

| Example Polymer | MW | AA | AMPS | Extending Group | Extending Group Type |
|---|---|---|---|---|---|
| A12 | 8500 | 52.5 | 22 | 25.5 | PEG 1000MA |
| A14 | 8150 | 38.6 | 22.5 | 38.9 | PEG 2000MA |

The terminology of this table is the same as that used for Example A2–A8.

EXAMPLE A13

To similar equipment as described in Example A1 was added 1280 grams of Vista 1012-62 together with 92 grams of allyl 44 ethylene oxide adduct, (known as ATLAS HD722, available from ICI). This was heated to 80° C.±2° C.

Over a period of 3 hours was added dropwise with stirring, a mixture consisting of:

|  | Weight (g) |
|---|---|
| Acrylic acid | 91 |
| 2-acrylamido-2-methyl propane sulphonic acid | 53 (1) |
| Deionized water | 53 (1) |
| Vazo 67 | 7.1 |

(1) dissolved separately

The resulting polymer had a solids content of 15%, weight average molecular weight 8150, 3.4% calculated water content and a viscosity of 2780 cps when measured at 25% with a Brookfield RVT viscometer at 25° C., spindle 3, speed 20. This gave a polymer of calculated weight ratios of acrylic acid 38.6, 2-acrylamido-2-methyl propane sulphonic acid 22.5, allyl 44 EO 38.9.

EXAMPLE A14

To similar equipment as described in Example A1 was added 690 grams of Vista 1012-62. This was heated to 80° C.±2° C. Over a period of 4 hours was added with stirring, a mixture consisting of:

|  | Weight (g) |
|---|---|
| 2-acrylamido-2-methyl propane sulphonic acid | 60 (1) |
| Deionized water | 60 (2) |
| PEG 1000 MA | 58 (2) |
| Isopropyl alcohol | 60 (4) |
| Vazo 67 | 15 (3) |

(2) Dissolved separately than add (1) and (3). When dissolved add (4).

At the end of the 4 hour reaction period, about 100 g of aqueous isopropanol was removed by azeotropic distillation under vacuum at 80° C. The resulting polymer had a solids content of 15% and a viscosity of 1040 cps when measured on the Brookfield RVT Viscometer at 25° C. spindle 2 speed 20. The water content was calculated as a maximum value of 6.4%. The polymer yielded a calculated weight ratio of AMPS 51.0, PEG 1000 MA 49.0.

EXAMPLE B1

To similar equipment as described in Example A1 was added 700 grams of glycerol triacetate as the solvent medium. This was heated to 80° C.±2° C. Over a period of 3 hours was added dropwise with stirring a mixture consisting of:

|  | Weight (g) |
|---|---|
| Methyl methacrylate | 119 |
| Butyl acrylate | 17.5 |
| Lauryl methacrylate | 35 |
| A172 | 3.5 |
| Vazo 67 | 3.5 |

A172 Vinyl-tris-(2-methoxy-ethoxy) silane from Union Carbide

The resulting polymer solution had a solids content of 20%, a calculated water content of zero, and a calculated weight ratio composition of butyl acrylate 10, methyl methacrylate 68, A172 2, lauryl methacrylate 20.

By an analogous method, Examples B2 and B3 were prepared.

| Example Polymer | BA | MMA | HPA | A172 | Extending Group | Extending Group Type |
|---|---|---|---|---|---|---|
| B2 | 48 | 40 | 0 | 2 | 10 | Lauryl methacrylate |
| B3 | 48 | 0 | 40 | 2 | 10 | Lauryl methacrylate |

BA - butyl acrylate  
HPA - Hydroxypropyl acrylate  ⎞ Monomer C  
MMA - Methyl methacrylate  
Lauryl methacrylate — Monomer A  
A172 — Monomer B

We claim:

1. A process for preparing a random or block copolymer of the general formula $$A_m B_n C_p$$

wherein

A is a vinyl or ethylenically unsaturated monomer or mixture thereof, said monomer containing a moiety capable of extending away from the surface of particles of a solid phase dispersed in a non-aqueous liquid, said moiety selected from the group consisting of polyalkoxy groups, polyalkoxylated fatty alcohol groups, long-chain alkyl groups, polyethylene glycol groups, polyalkoxylated alkyl groups and polyester groups;

B is a vinyl or ethylenically unsaturated monomer or mixture thereof, said monomer containing a moiety capable of association with the particles, said moiety selected from the group consisting of carboxylate groups, sulphonate groups, sulphate groups, either as acids or their corresponding salts or esters, amine groups or silane groups;

C is selected from the group consisting of ethylenically unsaturated $C_2$ to $C_6$ mono or dicarboxylic acids, $C_1$ to $C_6$ ester of ethylenically unsaturated $C_2$ to $C_6$ mono or dicarboxylic acids and the corresponding hydroxy derivatives thereof, styrene and vinyl acetate;

wherein the molar ratio of n:m is from 100:1 to 1:100, p is 0 or >0 and the molar ratio of (n+m):p is 100:1 to 1:100;

the process comprising the free radical polymerization of at least one monomer at a reaction temperature of 50° to 120° C., using as the sole solvent therefor a substantially non-aqueous liquid polymerization medium consisting essentially of a surfactant, less than 10 weight percent of water; and optionally, an ester of a polyhydric alcohol; wherein the surfactant must comprise a detergent.

2. A process according to claim 1 wherein the detergent comprises a liquid nonionic surfactant.

3. The process according to claim 1 wherein the non-aqueous liquid polymerization medium consists essentially of a liquid nonionic surfactant, which surfactant must comprise a liquid nonionic detergent; and less than 10 weight percent of water.

4. The process of claim 1 wherein the ester of the polyhydric alcohol is glycerol triacetate.

5. The process of claim 1 wherein component B in the polymer is a sulphonate group or corresponding salts or esters.

6. The process of claim 1 wherein the polymer has a molecular weight of 500 to 500,000.

7. The process of claim 1 wherein the polymer has a molecular weight of 1,000 to 100,000.

8. The process of claim 1 wherein the molar ratio of n:m in the polymer is from 50:1 to 1:50.

9. The process of claim 1 wherein the molar ratio of (n+m):p in the polymer is from 50:1 to 1:50.

10. A process for preparing a random or block copolymer of the general formula

wherein said polymer has a molecular weight of from about 500 to about 500,000 and wherein A is a vinyl or ethylenically unsaturated monomer or mixture thereof, said monomer containing a moiety capable of extending away from the surface of particles of a solid phase dispersed in a non-aqueous liquid, said moiety selected from the group consisting of polyalkoxy groups, polyalkoxylated fatty alcohol groups, long-chain alkyl groups, polyethylene glycol groups, polyalkoxylated alkyl groups and polyester groups;

B is a vinyl or ethylenically unsaturated monomer or mixture thereof, said monomer containing a moiety capable of association with the particles, said moiety selected from the group consisting of carboxylate groups, sulphonate groups, sulphate groups, either as acids or their corresponding salts or esters, amine groups or silane groups;

C is selected from the group consisting of ethylenically unsaturated $C_2$ to $C_6$ mono or dicarboxylic acids, $C_1$ to $C_6$ ester of ethylenically unsaturated $C_2$ to $C_6$ mono or dicarboxylic acids and the corresponding hydroxy derivatives thereof, styrene and vinyl acetate;

wherein the molar ratio of n:m is from 100:1 to 1:100, p is 0 or >0 and the molar ratio of (n+m):p is 100:1 to 1:100;

the process comprising the free radical polymerization of at least one monomer at a reaction temperature of 50° to 120° C., using as the sole solvent therefor a substantially non-aqueous liquid polymerization medium consisting essentially of a surfactant, less than 10 weight percent of water; and optionally, an ester of a polyhydric alcohol, wherein the surfactant must comprise a liquid nonionic detergent.

11. The process according to claim 1 wherein the substantially non-aqueous liquid polymerization medium consists essentially of a liquid nonionic detergent; and less than 10 weight percent of water.